(12) United States Patent
Kim et al.

(10) Patent No.: US 12,736,979 B2
(45) Date of Patent: Sep. 15, 2026

(54) SUBSTRATE TREATING APPARATUS AND SUBSTRATE TREATING METHOD

(71) Applicant: SEMES CO., LTD., Cheonan-si (KR)

(72) Inventors: Se Won Kim, Suwon-si (KR); Chung Woo Lee, Suwon-si (KR); Ji Won Cha, Hwaseong-si (KR)

(73) Assignee: Semes Co., LTD., Cheonan-si (KR)

( * ) Notice: Subject to any disclaimer, the term of this patent is extended or adjusted under 35 U.S.C. 154(b) by 294 days.

(21) Appl. No.: 18/395,973

(22) Filed: Dec. 26, 2023

(65) Prior Publication Data

US 2024/0210959 A1 Jun. 27, 2024

(30) Foreign Application Priority Data

Dec. 27, 2022 (KR) ........................ 10-2022-0186353

(51) Int. Cl.
*G06F 19/00* (2018.01)
*G05D 1/243* (2024.01)
(Continued)

(52) U.S. Cl.
CPC ............. *G05D 1/637* (2024.01); *G05D 1/243* (2024.01); *G06T 7/13* (2017.01); *G06T 7/74* (2017.01);
(Continued)

(58) Field of Classification Search
CPC .......... G05D 1/637; G05D 1/243; G06T 7/13; G06T 7/74; G06T 2207/30148;
(Continued)

(56) References Cited

U.S. PATENT DOCUMENTS 6,314,340 B1 * 11/2001 Mecham .............. A01G 25/167 239/69
7,525,649 B1 * 4/2009 Leong ................ G01N 21/8806 356/237.1

(Continued)

FOREIGN PATENT DOCUMENTS

JP 2003-264214 A 9/2003
KR 20-1997-0011213 3/1997

(Continued)

OTHER PUBLICATIONS

Notice of Allowance for Korean Application No. 10-2022-0186353 dated Jan. 21, 2025.

*Primary Examiner* — Masud Ahmed
(74) *Attorney, Agent, or Firm* — Harness, Dickey & Pierce, P.L.C.

(57) ABSTRACT

The substrate treating apparatus includes an analysis part configured to communicate with a measurement unit to be input with an information with respect to a boundary, to calculate a center coordinate value of a substrate and a center coordinate value of a support unit with an input information on the boundary, to set a calculated center coordinate value of the support unit as a center coordinate value of the measurement unit, to set a calculated center coordinate value of the substrate as a center coordinate value of a transfer robot, to record the center coordinate value of the transfer robot on a plane coordinate system of the measurement unit, and to convert a recorded center coordinate value of the transfer robot and a center coordinate value of the measurement unit to a plane coordinate system of the transfer robot to teach the transfer robot.

13 Claims, 6 Drawing Sheets

(51) Int. Cl.

| | |
|---|---|
| ***G05D 1/622*** | (2024.01) |
| ***G06T 7/13*** | (2017.01) |
| ***G06T 7/73*** | (2017.01) |
| *H04N 23/56* | (2023.01) |

(52) U.S. Cl.
CPC .... *G06T 2207/30148* (2013.01); *H04N 23/56* (2023.01)

(58) Field of Classification Search
CPC ..... G06T 7/66; H04N 23/56; H01L 21/67259; H01L 21/67748; H01L 21/681; H01L 21/68707; H01L 21/67742; H01L 21/6833; B25J 9/1664; B25J 15/08; B25J 9/1692; B25J 9/1697; B25J 11/0095; B25J 15/0014; G06F 17/10
See application file for complete search history.

(56) References Cited

U.S. PATENT DOCUMENTS

| | | | | |
|---|---|---|---|---|
| 7,933,665 B2 * | 4/2011 | Sakiya | H01L 21/681 | 700/121 |
| 2009/0255902 A1 * | 10/2009 | Satoh | H01J 37/32642 | 216/67 |
| 2017/0028561 A1 * | 2/2017 | Yamada | B25J 19/023 | |
| 2019/0064782 A1 * | 2/2019 | Tong | B23Q 7/04 | |

FOREIGN PATENT DOCUMENTS

| | | |
|---|---|---|
| KR | 10-2005-0023424 A | 3/2005 |
| KR | 10-2020-0075395 A | 6/2020 |
| KR | 10-2022-0062186 A | 5/2022 |

* cited by examiner

SUBSTRATE TREATING APPARATUS AND SUBSTRATE TREATING METHOD

CROSS-REFERENCE TO RELATED APPLICATIONS

A claim for priority under 35 U.S.C. § 119 is made to Korean Patent Application No. 10-2022-0186353 filed on Dec. 27, 2022, in the Korean Intellectual Property Office, the entire contents of which are hereby incorporated by reference.

BACKGROUND

Embodiments of the inventive concept described herein relate to a substrate treating apparatus and a substrate treating method, more specifically, a substrate treating apparatus and a substrate treating method for teaching a substrate transfer robot.

During the semiconductor manufacturing process, there is a transfer robot which transfers a substrate. Such a transfer robot must transfer the substrate so that a center of the substrate matches a support unit when placing the substrate on the support unit, so that the process proceeds uniformly on an entire substrate.

In this case, since the transfer robot does not match the center of the substrate and a center of the support unit at a time of initial installation or after long use, a teaching operation should be carried out to ensure that the center of the substrate and the center of the support unit match.

In this teaching operation, a correction value is measured by a measurement apparatus which measures a position of the substrate and the support unit, and if an axis of the measurement apparatus does not match an axis of the transfer robot, there is a problem that a value of the measurement apparatus which measures the center of the substrate or the center of the support unit has an error with a value in which a teaching is actually required.

SUMMARY

Embodiments of the inventive concept provide a substrate treating apparatus and a substrate treating method for teaching a center of a substrate to match a center of a support unit even if a center of a measurement unit and a center of a transfer robot do not match.

The technical objectives of the inventive concept are not limited to the above-mentioned ones, and the other unmentioned technical objects will become apparent to those skilled in the art from the following description.

The inventive concept provides a substrate treating apparatus. The substrate treating apparatus includes a support unit configured to include a support region for supporting a substrate; a transfer robot for transferring the substrate to the support unit; a measurement unit configured to measure the substrate and the support unit, and to detect an information with respect to a boundary of the substrate and the support unit; and an analysis part configured to communication with the measurement unit to be input with an information with respect to the boundary, to calculate a center coordinate value of the substrate and a center coordinate value of the support unit with an input information on the boundary, to set a calculated center coordinate value of the support unit as a center coordinate value of the measurement unit, to set a calculated center coordinate value of the substrate as a center coordinate value of the transfer robot, to record the center coordinate value of the transfer robot on a plane coordinate system of the measurement unit, and to convert a recorded center coordinate value of the transfer robot and a center coordinate value of the measurement unit to a plane coordinate system of the transfer robot to teach the transfer robot.

In an embodiment, the analysis part includes: a support unit side reference line detection unit configured to be input with a digital image information in connection with an image conversion unit, and to analyze the support unit within the digital image information to detect a support unit side reference line; and a support unit center calculation unit configured to be input with the support unit side reference line in connection with the support unit side reference line detection unit, and to calculate a center of the support unit side reference line to calculate the center coordinate value of the support unit.

In an embodiment, the analysis part further includes: a substrate side reference line detection unit configured to be input with the digital image information in connection with the image conversion unit, and to analyze the substrate within the digital image information to detect a substrate side reference line; and a substrate center calculation unit configured to be input with the substrate side reference line detection unit in connection with the substrate side reference line detection unit, and to calculate a center of the substrate and to calculate the center coordinate value of the substrate.

In an embodiment, the analysis part further includes: a measurement unit and transfer robot center calculation unit configured to be input with the center coordinate value of the support unit in connection with the support unit center calculation unit, to be input with the center coordinate value of the substrate in connection with the substrate center calculation unit, to set the center coordinate value of the support unit as the center coordinate value of the measurement unit, and to set the center coordinate value of the substrate as the center coordinate value of the transfer robot.

In an embodiment, the analysis part further includes: a first phase value calculation unit configured to be input with the center coordinate value of the measurement unit and the center coordinate value of the transfer robot in connection with the measurement unit and transfer robot center calculation unit, and to calculate a first phase value with an angle value at which the center coordinate value of the transfer robot is positioned with respect to the center coordinate value of the measurement unit when the center coordinate value of the transfer robot is changed to a plane coordinate system of the measurement unit.

In an embodiment, the analysis part further includes: a movement record unit configured to move the transfer robot by a first distance to record a movement coordinate value on a plane coordinate system of the transfer robot so any one coordinate value is not changed on the plane coordinate system of the transfer robot, and to move the center coordinate value of the transfer robot by the first distance on the plane coordinate system of the measurement unit as well to record a virtual coordinate value; and a second phase value calculation unit configured to be input with the center coordinate value of the measurement unit and the center coordinate value of the transfer robot in connection with the measurement unit and the center calculation unit of the transfer robot, to be input with the movement coordinate value and the virtual coordinate value in connection with the movement record unit, and to calculate a second phase value with an angle value between a line connecting the movement coordinate value and the center coordinate value of the transfer robot on a plane coordinate system of the measurement unit and a line connecting the center coordinate value of the transfer robot and the virtual coordinate value.

In an embodiment, the analysis part further includes: a teaching coordinate calculation unit configured to generate a teaching coordinate value which teaches the center coordinate value of the transfer robot by applying a trigonometric function formula to the first phase value, the second phase value, and the distance value on the plane coordinate system of the measurement unit.

In an embodiment, the teaching coordinate value (x4, y4) is calculated with the formula (6) below at the center coordinate value of the measurement unit. $x4=d1*\cos(\theta 2+\theta 1)$, $y4=d1*\sin(\theta 2+\theta 1)$—formula (6) (Here, d1 is a distance value to the center coordinate value of the transfer robot on the plane coordinate system of the measurement unit, θ1 is the first phase value, and θ2 is the second phase value.)

In an embodiment, the support unit includes: an electrostatic chuck providing a region on which the substrate is mounted and which sucks the substrate; and an outer protective body positioned outside the electrostatic chuck.

In an embodiment, the measurement unit includes: a camera imaging the support unit and the substrate to obtain an image information of the support unit and the substrate; and an image conversion unit configured to be input with the image information in connection with the camera, and converting an input image information to a digital image information.

In an embodiment, the measurement unit further includes: a laser irradiation unit configured to irradiate a laser in a line shaped to the support unit and the substrate, and the camera generates an image information including an image of the laser in a line shaped irradiated to the support unit and the substrate, and the analysis part detects a line change of a laser image included in the image information to distinguish the support unit side reference line and the substrate side reference line.

In an embodiment, at least four cameras are positioned to face the center of the support unit to obtain at least four image information, and an image information with respect to an intercept difference of the substrate and the support unit is obtained at each of the four image information.

The inventive concept provides a substrate treating method. The substrate treating method includes measuring a substrate and a support unit by a measurement unit to obtain an information which distinguishes a boundary between the substrate and the support unit; detecting a support unit side reference line of the support unit and a substrate side reference line of the substrate by an analysis part; calculating a center coordinate value of the substrate side reference line and a center coordinate value of the support unit by the analysis part; setting the center coordinate value of the support unit as a center coordinate value of the measurement unit, and setting a center coordinate value of the substrate as a center coordinate value of a transfer robot; and calculating a first phase value of the center coordinate value of the transfer robot based on the center coordinate value of the measurement unit by the analysis part, calculating a second phase value between the center coordinate value of the measurement unit and the center coordinate value of the transfer robot by moving the transfer robot, and teaching so a distance value between the center coordinate value of the measurement unit and the center coordinate value of the transfer robot, and the first phase value and the second phase value are compensated to the center coordinate value of the transfer robot.

In an embodiment, the calculating the first phase value further includes: calculating an angle value at which the center coordinate value of the transfer robot, with respect to the center coordinate value of the measurement unit, is positioned—as the first phase value, when the center coordinate value of the transfer robot is converted to the plane coordinate system of the measurement unit.

In an embodiment, the calculating the first phase value further includes: moving the transfer robot by a first distance so a coordinate value of any one axis is not changed on the plane coordinate system of the transfer robot to record a movement coordinate value on a plane coordinate system of the transfer robot, and moving the transfer robot by the first distance on the plane coordinate system of the measurement unit as well to record a virtual coordinate value; and calculating a second phase value with an angle value between a line connecting the center coordinate value of the transfer robot on the plane coordinate system of the measurement unit and the movement coordinate value, and a line connecting the center coordinate value of the transfer robot and the virtual coordinate value.

In an embodiment, the calculating the first phase value further includes: generating a teaching coordinate value for teaching the center coordinate value of the transfer robot by applying a trigonometric function formula to the first phase value, the second phase value, and the distance value on the plane coordinate value of the measurement unit.

In an embodiment, the teaching coordinate value (x4, y4) is calculated with the following formula (6) on the plane coordinate system of the measurement unit. $x4=d1*\cos(\theta 2+\theta 1)$, $y4=d1*\sin(\theta 2+\theta 1)$—formula (6) (Here, d1 is a distance value to the center coordinate value (x1,y1) of the transfer robot 20 on the plane coordinate system 3*a* of the measurement unit, θ1 is a first phase value, and θ2 is a second phase value.)

In an embodiment, the measuring the substrate and the support unit includes: irradiating a line shaped laser to the support unit and the substrate, and detecting a line change of a laser image included in an image information at the detecting the support unit side reference line to distinguish the support unit side reference line and the substrate side reference line.

In an embodiment, the measuring the substrate and the support unit includes: positioning at least four cameras to opposite a center of the support unit to obtain at least four image information, so an image information on an intercept difference between the substrate and the support unit is obtained in each of the four image information.

The inventive concept provides a substrate treating apparatus. The substrate treating apparatus includes a support unit configured to include a region at which a substrate is mounted and which includes an electrostatic chuck for sucking the substrate and an outer protective body positioned outside the electrostatic chuck; a transfer robot for transferring the substrate to the support unit; a measurement unit configured to include a camera imaging the support unit and the substrate to generate an image information including a laser image in a line shaped irradiated to the support unit and the substrate, and wherein at least four cameras are positioned to face the center of the support unit to obtain at least four image information, and an image information with respect to an intercept difference of the substrate and the support unit is obtained at each of the four image information, an image conversion unit configured to be input with the image information in connection with the camera, and converting an input image information to a digital image information, and a laser irradiation unit configured to irradiate a laser in a line shaped to the support unit and the substrate; and an analysis part configured to include: a support unit side reference line detection unit configured to be input with the digital image information in connection with an image conversion unit, and to analyze the support unit within the digital image information to detect a support unit side reference line; a support unit center calculation unit configured to be input with the support unit side reference line in connection with the support unit side reference line detection unit, and to calculate a center of the support unit side reference line to calculate a center coordinate value of the support unit; a substrate side reference line detection unit configured to be input with the digital image information in connection with the image conversion unit, and to analyze the substrate within the digital image information to detect a substrate side reference line; a substrate center calculation unit configured to be input with the substrate side reference line in connection with the substrate side reference line detection unit, and to calculate a center of the substrate to calculate a center coordinate value of the substrate; a measurement unit and transfer robot center calculation unit configured to be input with the center coordinate value of the support unit in connection with the support unit center calculation unit and to be input with the center coordinate value of the substrate in connection with the substrate center calculation unit, to set the center coordinate value of the support unit as a center coordinate value of the measurement unit, and to set the center coordinate value of the substrate as a center coordinate value of the transfer robot; a first phase value calculation unit configured to be input with the center coordinate value of the measurement unit and the center coordinate value of the transfer robot in connection with the measurement unit and transfer robot center calculation unit, and to calculate a first phase value with an angle value at which the center coordinate value of the transfer robot is positioned with respect to the center coordinate value of the measurement unit when the center coordinate value of the transfer robot is changed to a plane coordinate system of the measurement unit; a movement record unit configured to move the transfer robot by a first distance so a coordinate value of any one axis is not changed on a plane coordinate system of the transfer robot to record a movement coordinate value on the plane coordinate system of the transfer robot, and to move the center coordinate value of the transfer robot by the first distance on the plane coordinate system of the measurement unit as well to record a virtual coordinate value; and a second phase value calculation unit configured to be input with the center coordinate value of the measurement unit and the center coordinate value of the transfer robot in connection with the measurement unit and the center calculation unit of the transfer robot, to be input with the movement coordinate value and the virtual coordinate value in connection with the movement record unit, and to calculate a second phase value with an angle value between a line connecting the center coordinate value of the transfer robot and the movement coordinate value on the plane coordinate system of the measurement unit and a line connecting the center coordinate value of the transfer robot and the virtual coordinate value; and a teaching coordinate calculation unit configured to generate a teaching coordinate value for teaching the center coordinate value of the transfer robot by applying a trigonometric function formula to the first phase value, and the second phase value, and a distance value on the plane coordinate system of the measurement unit, and wherein the teaching coordinate value (x4, y4) is calculated with the following formula (6) at the center coordinate value of the measurement unit. $x4=d1*\cos(\theta 2+\theta 1)$, $y4=d1*\sin(\theta 2+\theta 1)$—formula (6) (Here, d1 is a distance value to the center coordinate value of the transfer robot on the plane coordinate system of the measurement unit, θ1 is the first phase value, and θ2 is the second phase value.)

According to an embodiment of the inventive concept, a center of a substrate can be taught to match a center of a support unit even if a center of a measurement unit and a center of a transfer robot do not match.

The effects of the inventive concept are not limited to the above-mentioned ones, and the other unmentioned effects will become apparent to those skilled in the art from the following description.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
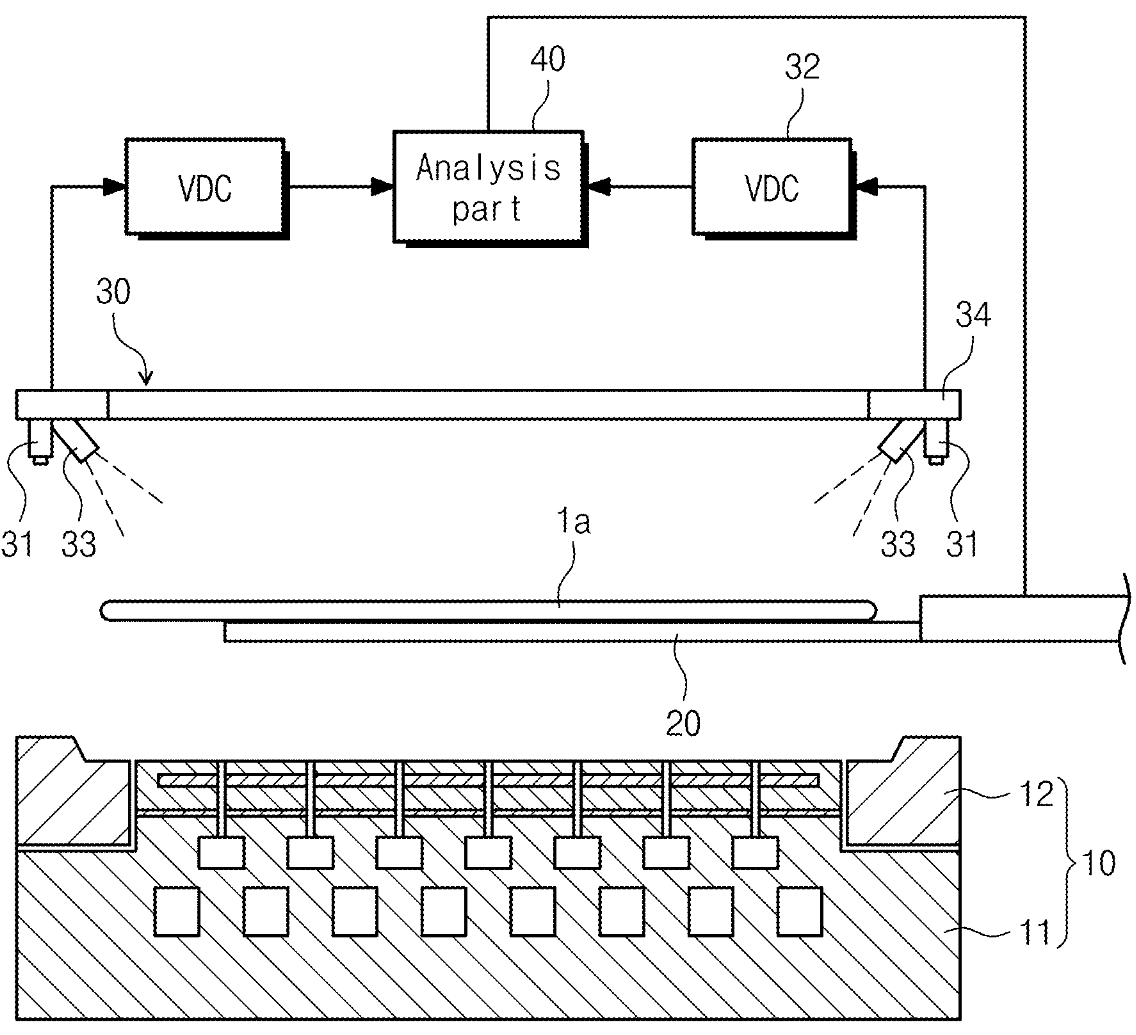
FIG. 1 is a front view of a substrate treating apparatus according to an embodiment of the inventive concept.

Example embodiments will now be described more fully with reference to the accompanying drawings. Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms “a,” “an,” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

When the term "same" or "identical" is used in the description of example embodiments, it should be understood that some imprecisions may exist. Thus, when one element or value is referred to as being the same as another element or value, it should be understood that the element or value is the same as the other element or value within a manufacturing or operational tolerance range (e.g., ±10%).

When the terms "about" or "substantially" are used in connection with a numerical value, it should be understood that the associated numerical value includes a manufacturing or operational tolerance (e.g., ±10%) around the stated numerical value. Moreover, when the words "generally" and "substantially" are used in connection with a geometric shape, it should be understood that the precision of the geometric shape is not required but that latitude for the shape is within the scope of the disclosure.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Figure 2:
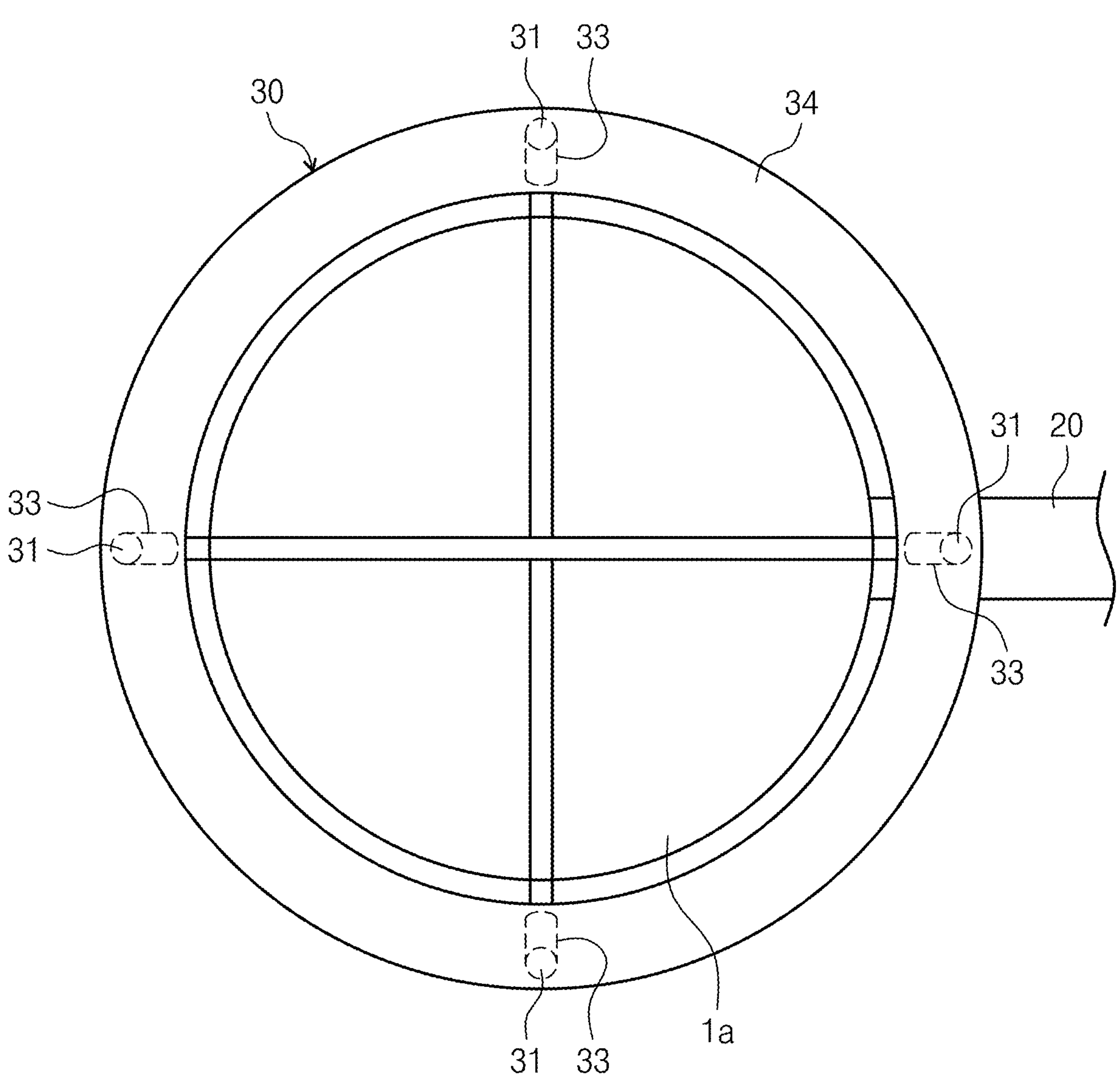
FIG. 2 is a plan view of the substrate treating apparatus shown in FIG. 1.
Figure 3:
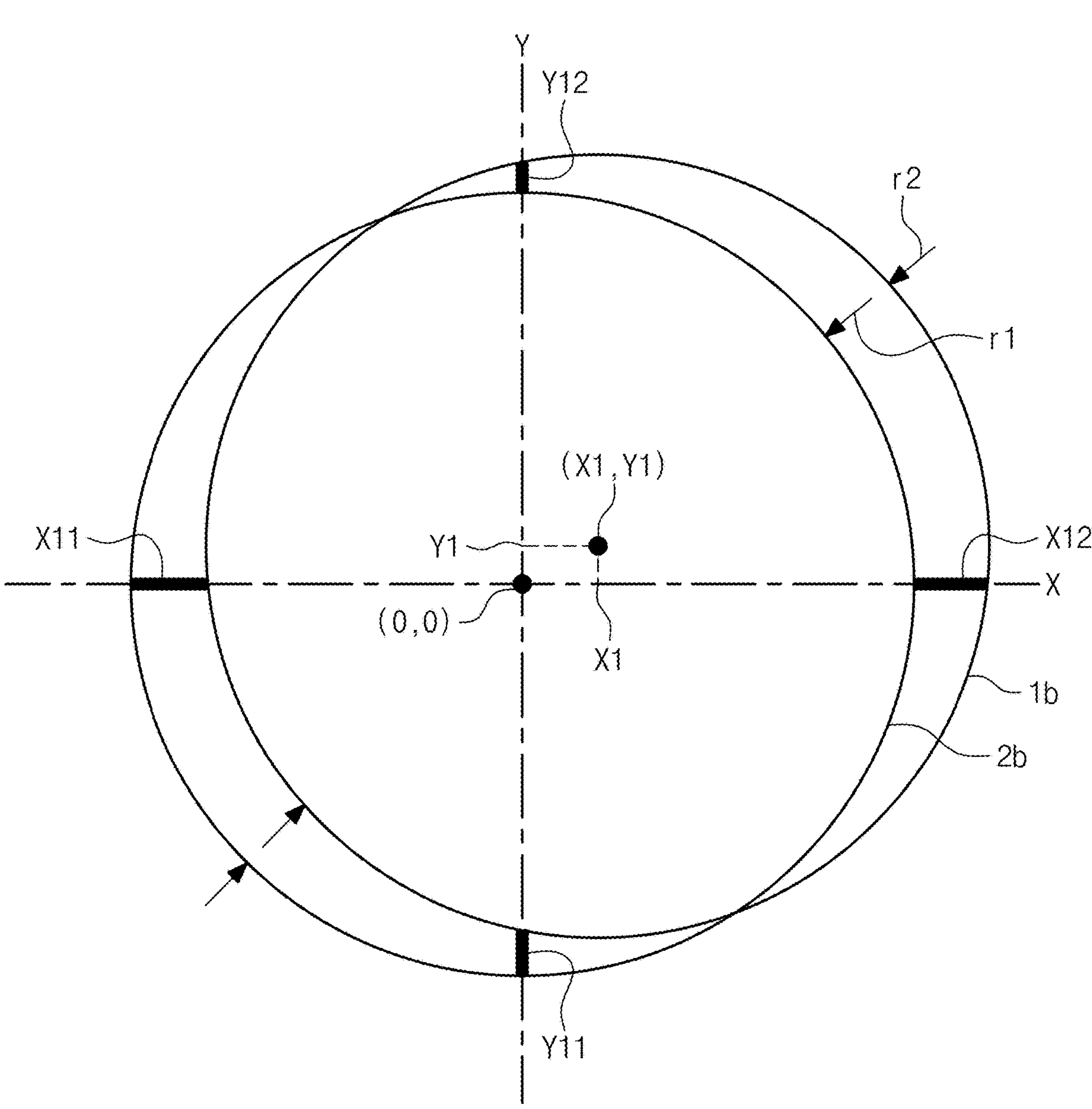
FIG. 3 is a plan view of a substrate side reference line and a support unit side reference line shown in FIG. 1 on a two-dimensional plane coordinate.
Figure 4:
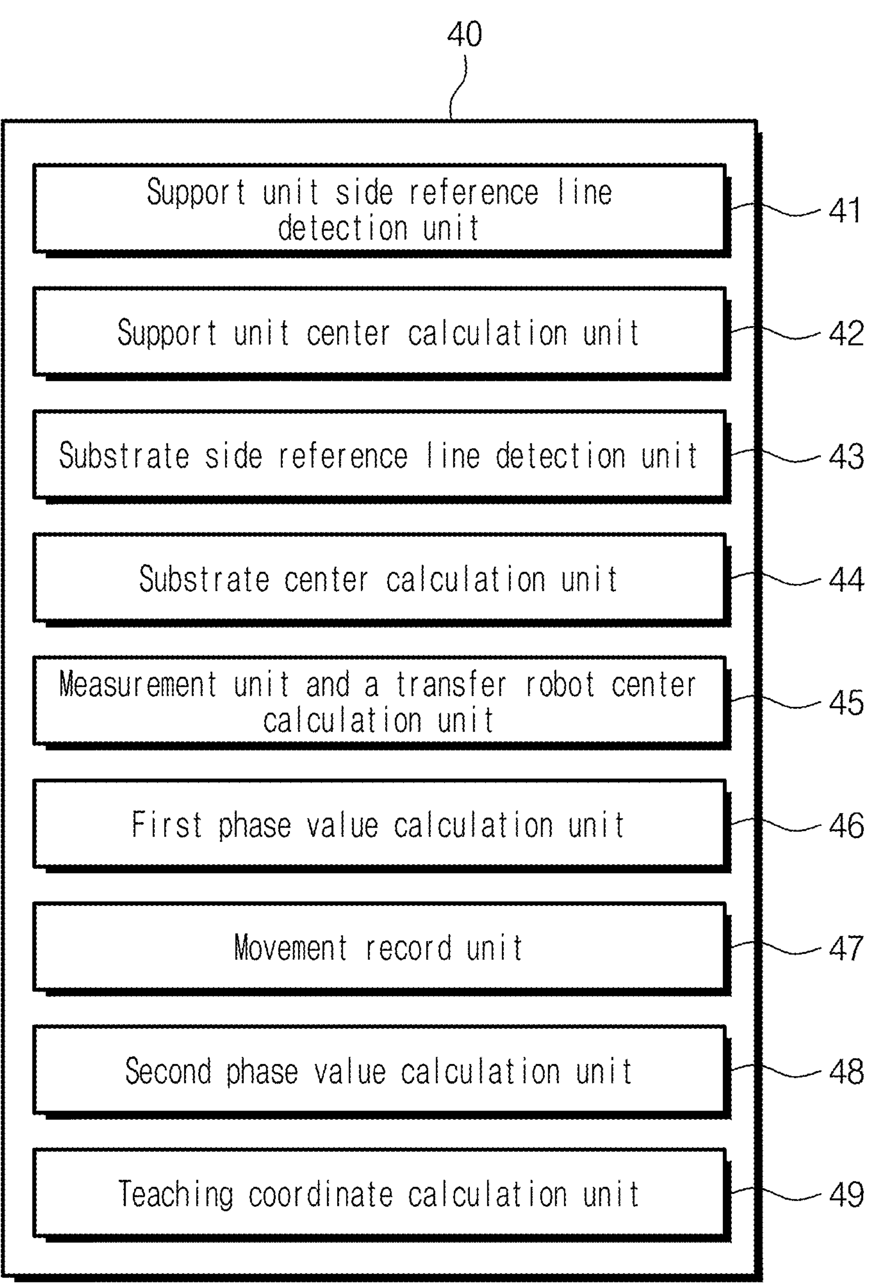
FIG. 4 is a block view of a detailed configuration of an analysis part shown in FIG. 1.
Figure 5:
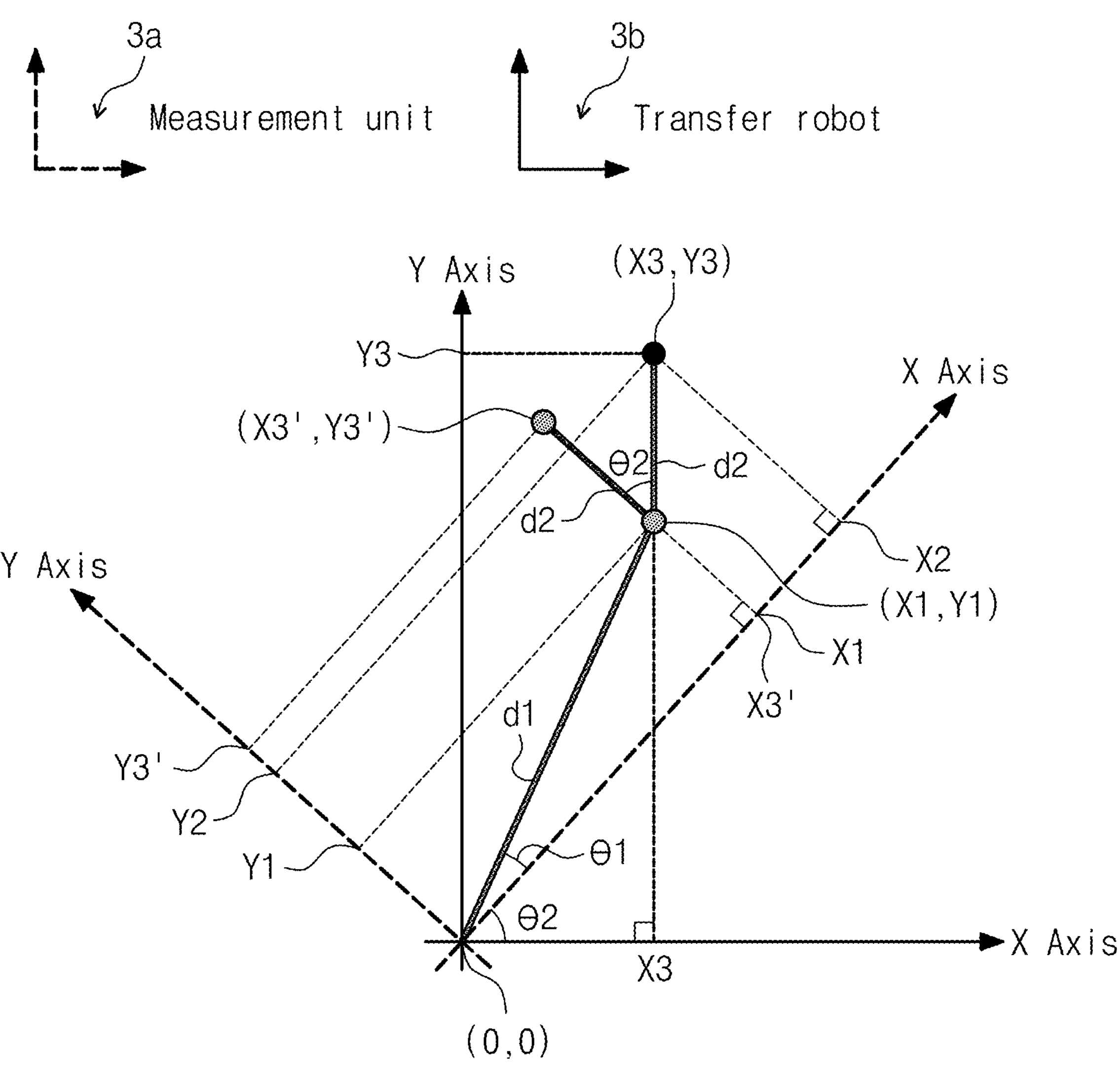
FIG. 5 is a plan view of a center coordinate value of a measurement unit and a center coordinate value of a transfer robot for each of a 2D coordinate system of the measurement unit and a 2D coordinate system of the transfer robot shown in FIG. 1.

FIG. 1 is a front view of a substrate treating apparatus according to an embodiment of the inventive concept. FIG. 2 is a plan view of the substrate treating apparatus shown in FIG. 1. FIG. 3 is a plan view of a substrate-side reference line and a support unit-side reference line shown in FIG. 1 on a two-dimensional plane coordinate. FIG. 4 is a block view of a detailed configuration of an analysis part shown in FIG. 1. FIG. 5 is a plan view of a center coordinate value of a measurement unit and a center coordinate value of a transfer robot for each of a 2D coordinate system of the measurement unit and a 2D coordinate system of the transfer robot shown in FIG. 1.

As shown in FIG. 1 to FIG. 5, the substrate treating apparatus according to an embodiment of the inventive concept includes a support unit 10, a transfer robot 20, a measurement unit 30, and an analysis part 40.

The support unit 10 has a support region for supporting the substrate 1*a*. The support unit 10 may be formed of all supports supporting the substrate 1*a* in a semiconductor manufacturing process. As an embodiment of the support unit 10, the support unit 10 may include an electrostatic chuck 11 and an outer protection body 12.

The electrostatic chuck 11 provides a region at which the substrate 1*a* is mounted, and if a power is supplied, an electrostatic force is generated to suck the substrate 1*a*. The electrostatic chuck 11 may be disposed in a process chamber (not shown) to fix the substrate 1*a*, if necessary. However, in the inventive concept, the electrostatic chuck 11 is not limited to being placed in the process chamber, and the electrostatic chuck 11 can be placed and used in various locations as necessary. In this case, the substrate 1*a* mounted on the electrostatic chuck 11 must be arranged so that a center of the electrostatic chuck 1*a* and a center of the substrate 1*a* match according to the transfer robot 20 to ensure that the process applied to the substrate 1*a* proceeds uniformly over an entire region. Meanwhile, the substrate 1*a* mounted on the electrostatic chuck 11 may be formed of a disk-shaped wafer or a circular ring. In other words, the substrate 1*a* can be variously modified into a circular measuring apparatus for and inspection of the support unit 10 a wafer or or a ring-shaped dummy module which are transferred by the transfer robot 20.

The outer protection body 12 is disposed outside the electrostatic chuck 11. The outer protection body 12 serves to protect the electrostatic chuck 11 from a damage during a process. In addition, the outer protection body 12 is formed to form a boundary region in contact with the electrostatic chuck 11 so that a line is identified near a region in contact. In this case, the line in which the electrostatic chuck 11 and the outer protective body 12 contact each other may be formed as a support unit side reference line 2*b* to be described later. In addition, the outer protection body 12 is formed protruding so that a shape of a circumference is spaced apart from an outer shape of the substrate 1*a* at regular intervals, thereby forming the support unit side reference line 2*b*. As an example of the outer protection body 12, in the embodiment, the outer protection body 12 may be composed of a focus ring or an insulation ring. However, in the inventive concept, a configuration of the outer protection body 12 is not limited to the above example, and can be implemented by being modified into various configurations.

The transfer robot 20 transfers the substrate 1*a* to the support unit 10. Such a transfer robot 20 is configured in various forms, such as a multi-joint, multidegree-of-freedom robot or a linear transfer robot using a linear actuator. The transfer robot 20 transfers the substrate 1*a* to mount the support unit 10. In this case, the transfer robot 20 mounts the substrate 1*a* on the support unit 10 so that the center of the substrate 1*a* matches the center of the support unit 10, and if a center of the measurement unit 30 does not match the center of the support unit 10 or an error occurs on its own, a teaching is performed by a teaching coordinate value (x4,y4) calculated below.

The measurement unit 30 measures the substrate 1*a* and the support unit 10 to obtain an information separating a boundary between the substrate 1*a* and the support unit 10. The measurement unit 30 can detect a position of the substrate 1*a* with respect on the substrate side reference line 1*b*, can detect a position of the support unit side reference line 2*b* of the support unit 10, and can detect the substrate side reference line 1*b* and the support unit side reference line 2*b* using a vision system, while using measurement sensors such as a laser sensor, an optical sensor, and an ultrasonic sensor.

In the embodiment, the measurement unit 30 includes a camera 31, an image conversion unit 32, a laser irradiation unit 33, and a measurement table 34.

The camera 31 images the support unit 10 and the substrate 1*a* to obtain an image information of the support unit 10 and the substrate 1*a*. In this case, the camera 31 may obtain only the image information on the substrate 1*a* while the substrate 1*a* is mounted on the transfer robot 20, and may obtain only the image information on the electrostatic chuck 11 of the support unit 10. In contrast, the camera 31 may allow the substrate 1*a* and the support unit 10 to be generated within one image information while the substrate 1*a* is mounted on the support unit 10. In addition, the camera 31 generates the image information including a line-shaped laser image irradiated to the support unit 10 and the substrate 1*a*. In this case, if the line-shaped laser image is irradiated to the substrate 1*a* and the support unit 10, the substrate-side reference line 1*b* and the support unit-side reference line 2*b* may be more clearly distinguished according to a refractive shape of the laser line. In addition, at least four cameras 31 are placed opposite the center of the support unit 10 to obtain at least four image information, and an image information on an intercept difference of the substrate 1*a* and the support unit 10 can be obtained in each of the four image information. In this case, the analysis part 40 may analyze each of the four image information to analyze a substrate 1*a* side support line and a support unit 10 side support line.

The image conversion unit 32 receives an image information in connection with the camera 31 and converts an input image information into a digital image information.

The laser irradiation unit 33 irradiates the support unit 10 and the substrate 1*a* with a line-shaped laser. The laser irradiation unit 33 irradiates the line-shaped laser on the support unit 10 and the substrate 1*a* so that the substrate-side reference line 1*b* and the support unit-side reference line 2*b* are distinguished in a form of refraction of the laser line irradiated at a boundary between the substrate 1*a* and the support unit 10.

The measurement table 34 provides a region in which the camera 31 and the laser irradiation unit 33 are mounted. In the embodiment, the measurement table 34 may be formed in a circular ring or a disk shape. In this case, the measurement table 34 may be fixed to an inside or an outside of the process chamber (not shown) at a time of measurement, or may be placed while a position of the position control unit (not shown) is changed.

The analysis part 40 is an apparatus which analyzes and coordinates a vision image and calculates positions in the coordinated image information with a modified program.

In the embodiment, the analysis part 40 includes a support unit-side reference line detection unit 41, a support unit center calculation unit 42, a substrate side reference line detection unit 43, a substrate center calculation unit 44 a support unit-side reference line detection unit 41, a support unit center calculation unit 42, a substrate side reference line detection unit 43, a substrate center calculation unit 43, a measurement unit and transfer robot center calculation unit 45, a first phase value calculation unit 46, a movement record unit 47, a second phase value calculation unit 48, and a teaching coordinate calculation unit 49.

a measurement unit and transfer robot center calculation unit 45, a first phase value calculation unit 46, a movement record unit 47, a second phase value calculation unit 48, and a teaching coordinate calculation unit 49.

The support unit side reference line detection unit 41 receives a digital image information in connection with the image conversion unit 32, analyzes the support unit 10 in the digital image information to detect the support unit side reference line 2*b*. The support unit-side reference line 2*b* may be a circular path with respect to an outer periphery of the electrostatic chuck 11, and may be a circular path with respect to an inner periphery or a surface an at which a inclined surface ends of the outer protection body 12.

The support unit center calculation unit 42 is input with the support unit side reference line 2*b* in connection with the support unit side reference line detection unit 41 and calculates a center coordinate value (0,0) of the support unit 10 by calculating a center of the support unit side reference line 2*b*. In this case, the support unit center calculation unit 42 can calculate the center coordinate value (0,0) of the support unit 10 by applying a circular formula with an analyzed support unit side reference line 2*b* and a diameter value of the support unit side reference line 2*b*, which is previously stored. Here, the center coordinate value (0,0) of the support unit 10 becomes a criterion for calculating the center coordinate value (0,0) of the measurement unit 30 or the center coordinate value (x1,y1) of the transfer robot 20. If the center coordinate value (x1, y1) of the transfer robot 20 and the center coordinate value (x1, y1) of the substrate 1*a* match the center coordinate value (0,0) of the support unit 10, a teaching operation of the transfer robot 20 may be completed, and to complete the teaching operation a driving of the below configuration must be completed.

The substrate-side reference line detection unit 43 is input with a digital image information in connection with the image conversion unit 32 and analyzes the substrate 1*a* in the digital image information to detect the substrate-side reference line 1*b*. The substrate-side reference line 1*b* may be a circular path with respect to an outer periphery of the substrate 1*a*.

The substrate center calculation unit 44 is connected with the substrate-side reference line detection unit 43 to be input with the substrate-side reference line 1*b*, and to calculate the center coordinate (x1, y1) of the substrate 1*a* by calculating the center of the substrate 1*a*. Here, The substrate center calculation unit 44 receives the substrate side reference line 1*b* in connection with the substrate side reference line detection unit 43 and calculates the center of the substrate 1*a* to calculate the center coordinate value (x1,y1) of the substrate 1*a*. Here, the substrate center calculation unit 44 may calculate the center coordinate value (0,0) of the support unit 10 by applying a circular formula to an analyzed support unit side reference line 2*b* and a diameter value of the substrate side reference line, which is previously stored. Here, as an embodiment of a method of calculating the center coordinate value (x1, y1) of the substrate 1*a*, on the plane coordinate system having the center coordinate value of the support unit 10 as the origin, an x-axis intercept value (x12) in the + direction, an x-axis intercept value (x11) in the − direction, a y-axis intercept value (x12) in the + direction, and a y-axis intercept value (x11) in the − direction, a diameter r1 of the support unit side reference line 2*b*, and a diameter r2 of the substrate side reference line 1*b*, with respect to an intercept difference of the support unit side reference line 2*b* and the substrate unit side reference line 1*b*, a mutual relationship of each are expressed in a formula such as the following formula (1) to formula (4).

$$x11 = \left(x1 - \sqrt{(r2)^2 - (y1)^2}\right) - (-r1) \quad (1)$$

$$x12 = \left(x1 + \sqrt{(r2)^2 - (y1)^2}\right) - (r1) \quad (2)$$

$$y11 = \left(y1 - \sqrt{(r2)^2 - (x1)^2}\right) - (r1) \quad (3)$$

$$y12 = \left(y1 + \sqrt{(r2)^2 - (x1)^2}\right) - (r1) \quad (4)$$

$$(x1, y1) = \left((x11 + x12)/2, (y11 + y12)/2\right) \quad (5)$$

When converting to the center coordinate value (x1, y1) of the substrate 1*a* using formula (1) to formula (4), the center coordinate value (x1, y1) of the substrate 1*a* is expressed as formula (5).

Therefore, the substrate center calculation unit 44 can implement the center coordinate value (x1,y1) of the substrate 1*a* on a plane coordinate system 3*a* of the measurement unit 30 shown in FIG. 5 by formula (5) using an intercept value shown in FIG. 3. At this time, on the plane coordinate system 3*a* of the measurement unit 30, the distance value d1, which is a separation distance from the center coordinate value x1,y1 of the substrate 1*a*, can also be calculated based on the center coordinate value (0,0) of the measurement unit 30.

The measurement unit and transfer robot center calculation unit 45 is input with the center coordinate value (0,0) of the support unit 10 is input in connection with the support unit center calculation unit 42, and input with the center coordinate value (x1,y1) of the substrate 1*a* in connection with the substrate center calculation unit 44. In this case, the measurement unit and transfer robot center calculation unit 45 sets the center coordinate value (0,0) of the support unit 10 as the center coordinate value (0,0) of the measurement unit 30, and sets the center coordinate value (x1,y1) of the substrate 1*a* as the center coordinate value (x1,y1) of the transfer robot 20. Therefore, the measurement unit and transfer robot center calculation unit 45 can match an origin of the measurement unit 30 and an origin of the transfer robot 20 to (0,0) on the plane coordinate system. At this time, the center coordinate value (0,0) of the measurement unit 30 is set as the origin (0,0) on the plane coordinate system 3*a* of the measurement unit 30, and the center coordinate value (x1,y1) of the transfer robot 20 is recorded as rotated a predetermined angle from the origin by a predetermined distance value d1 with respect to the plane coordinate system 3*a* of the measurement unit 30.

The first phase value calculation unit 46 is input with the center coordinate value (0,0) of the measurement unit 30 and the center coordinate value (x1,y1) of the transfer robot 20 in connection with the measurement unit 30 and the transfer robot 20. In this case, when the first phase value calculation unit 46 converts the center coordinate value x1, y1 of the transfer robot 20 to the plane coordinate system 3*a* of the measurement unit 30, an angle value at which the center coordinate value (x1, y1) of the transfer robot 20 is positioned is calculated as the first phase value θ1 with respect to the center coordinate value (0,0) of the measurement unit 30. In this case, the first phase value θ1 may calculated by applying an arctan (Y1/X1) which is a trigonometric function formula to the distance value d1 to the center coordinate value (x1,y1) of the transfer robot 20 on the plane coordinate system 3*a* of the measurement unit 30.

The movement record unit 47 moves the transfer robot 20 in an axial direction to record at each of the plane coordinate system 3*a* of the measurement unit 30 and the plane coordinate system 3*b* of the transfer robot 20, and calculates an angle between lines up to the coordinate value recorded in each coordinate system as a second phase value θ2. More specifically, the movement record unit 47 moves the transfer robot 20 by the first distance d2 so that the coordinate value of any one axis of the center coordinate value 0,0 of the measurement unit 30 does not change. Then, on the plane coordinate system 3*b* of the transfer robot 20, the movement record unit 47 generates a movement coordinate value (x3,y3) in a state at which the center coordinate value (x1,y1) of the transfer robot 20 is moved by the first distance d2 on the Y axis. At this time, with respect to the plane coordinate system 3*a* of the measurement unit 30, the movement coordinate value (x3, y3) is measured in a state moved to the Y axis on the plane coordinate system 3*a* of the measurement unit 30. Accordingly, the movement record unit 47 moves the center coordinate value (x1, y1) of the transfer robot 20 by the first distance d2 on the Y axis on the plane coordinate system 3*a* of the measurement unit 30, and records a virtual coordinate value (x3', y3') on the plane coordinate system 3*a* of the measurement unit 30.

The second phase value calculation unit 48 is input with the center coordinate value (0,0) of the measurement unit 30 and the center coordinate value (x1,y1) of the transfer robot 20 in connection with measurement unit and transfer robot center calculation unit 45, and is input with the movement coordinate value (x3,y3) and the virtual coordinate value (x3',y3') in connection with the movement record unit 47. In this case, the second phase value calculation unit 48 calculates the second phase value θ2 with an angle between a line connecting the movement coordinate value (x3, y3) and the center coordinate value (x1, y1) of the transfer robot 20 on the plane coordinate system 3*a* of the measurement unit 30, and a line connecting the center coordinate value (x1, y1) of the transfer robot 20 and the virtual coordinate value (x3', y3). Here, the second phase value θ2 is calculated by the formula of arctan ((X2-X1)/(Y2-Y1)), and (X2-X1) is a movement distance on the X-axis when the movement coordinate value (x3,y3) is recorded on the plane coordinate system 3*a* of the measurement unit 30, and (Y2-Y1) is a movement distance on the Y axis when the movement coordinate value (x3, y3) is recorded on the plane coordinate system 3*a* of the measurement unit 30.

The teaching coordinate calculation unit 49 is input with the distance value d1 on the plane coordinate system 3*a* of the measurement unit 30 until the center coordinate value (x1, y1) of the transfer robot 20, the first phase value θ1, and the second phase value θ2 in connection with the substrate center calculation unit 44, the first phase value calculation unit 14, and the second phase value calculation unit 48. In this case, the teaching coordinate calculation unit 49 generates the teaching coordinate value (x4, y4) that teach the center coordinate value (x1, y1) of the transfer robot 20 by applying the trigonometric function formula to the distance value d1, the first phase value θ1, and the second phase value θ1. Here, the teaching coordinate value (x4, y4) is calculated by the following formula (6) on the plane coordinate system 3*a* of the measurement unit 30.

$$x4 = d1 * \cos(\ominus 2 + \ominus 1),\ y4 = d1 * \sin(\ominus 2 + \ominus 1) \quad \text{formula (6)}$$

(Here, d1 is a distance value d1 to the center coordinate value (x1,y1) of the transfer robot 20 on the plane coordinate system 3*a* of the measurement unit 30, 01 is a first phase value θ1, and θ2 is a second phase value θ2.)

Therefore, when the teaching coordinate calculation unit 49 applies the teaching coordinate value (x4, y4) to the transfer robot 20 to teach, the center of the substrate 1*a* can be accurately matched with the center of the support unit 10 even if the center of the measurement unit 30 and the center of the transfer robot 20 do not match.

Hereinafter, a substrate treating method of a substrate treating apparatus according to an embodiment of the inventive concept as described above will be described.

Figure 6:
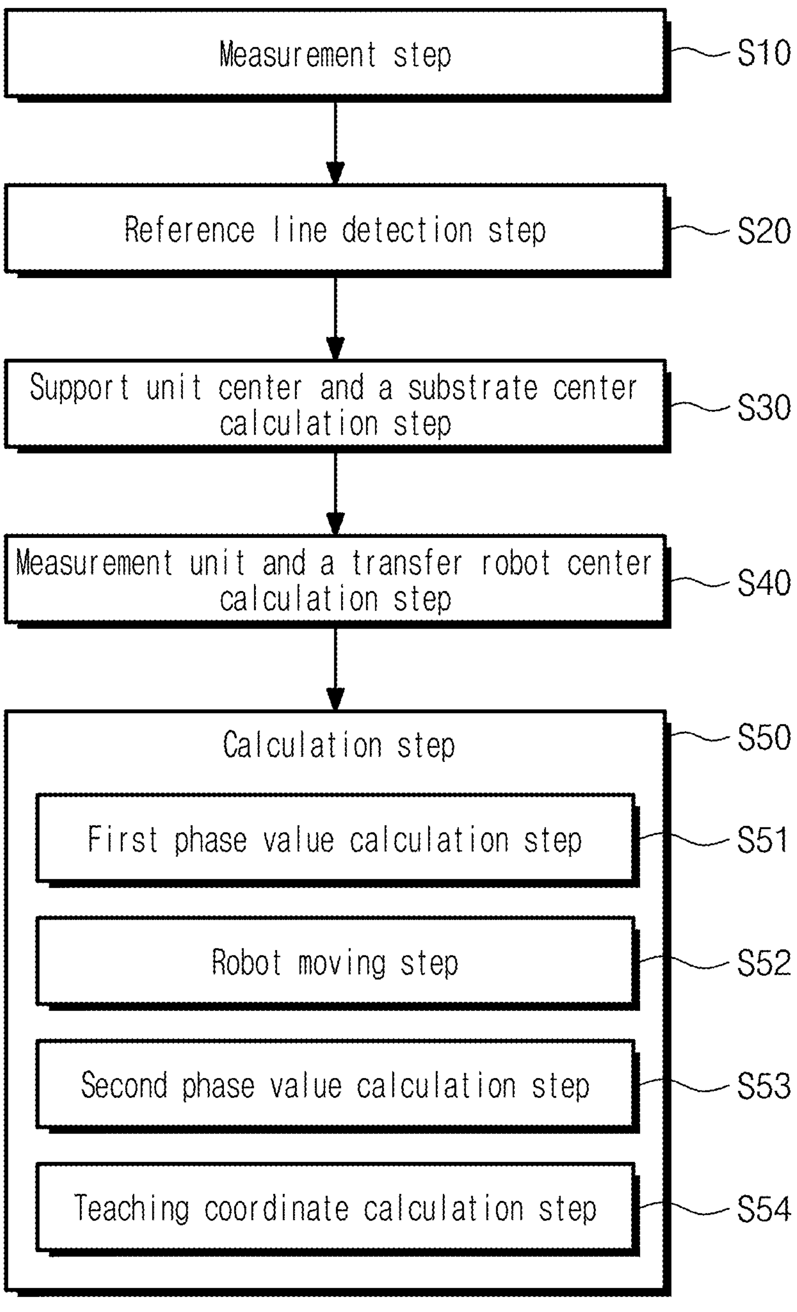
FIG. 6 is a flowchart of a substrate treating method of the substrate treating apparatus according to an embodiment of the inventive concept.

FIG. 6 is a flowchart illustrating a substrate treating method of the substrate treating apparatus according to an embodiment of the inventive concept.

Referring further to FIG. 6, the substrate treating method according to an embodiment of the inventive concept includes a measurement step S10, a reference line detection step S20, a support unit and a substrate center calculation step S30, a measurement unit and a transfer robot center calculation step S40, and a calculation step S50.

First, in the measurement step S10, the measurement unit 30 measures the substrate 1*a* and the support unit 10 to obtain an information separating a boundary between the substrate 1*a* and the support unit 10. As described above, in the measurement step S10, a line-shaped laser may be irradiated to the support unit 10 and the substrate 1*a*. In addition, at least four cameras 31 are positioned opposite the center of a support unit 10 to obtain at least four image information, and an image information on an intercept difference between the substrate 1*a* and the support unit 10 is obtained in each of the four image information.

Next, in the reference line detection step S20, the support unit-side reference line detection unit 41 and the substrate-side reference line detection unit 43 of the analysis part 40 detect the support unit-side reference line 2*b* of the support unit 10 and the substrate-side reference line 1*b* of the substrate 1*a*. In this case, the reference line detection step S20 may detect a line change of the laser image included in the image information of the measurement unit 30 to distinguish the support unit-side reference line 2*b* from the substrate-side reference line 1*b*. Next, in the support unit and substrate center calculation step S30, the support unit-center calculation unit 42 and the substrate center calculation unit 44 of the analysis part 40 calculate the center coordinate value (x1,y1) of the substrate-side reference line 1*b* and the center coordinate value (0,0) of the support unit 10.

Next, in the measurement unit and transfer robot center calculation step S40, the center coordinate value (0,0) of the support unit 10 is then set as the center coordinate value (0,0) of the measurement unit 30, and the center coordinate value (x1, y1) of the substrate 1*a* is set as the center coordinate value (x1,y1) of the transfer robot 20 by the measurement unit and transfer robot center calculation unit 45 of the analysis part 40.

Next, the calculation step S50 may include a first phase value calculation step S51, a robot moving step S52, a second phase value calculation step S53, and a teaching coordinate calculation step S54.

First, in the first phase value calculation step S51, when the first phase value calculation unit 46 of the analysis part 40 converts the center coordinate value (x1, y1) of the transfer robot 20 into the plane coordinate system 3*a* of the measurement unit 30, an angle value at which the center coordinate value (x1, y1) of the transfer robot 20 is positioned with respect to the center coordinate value (0, 0) of the measurement unit 30 is calculated as the first phase value θ1.

Next, in the robot movement step S52, the movement record unit 47 of the analysis part 40 moves the transfer robot 20 by the first distance d2 so that the coordinate value of an axis does not change on the plane coordinate system 3*b* of the transfer robot 20 to record the movement coordinate value (x3, y3) on the plane coordinate system 3*b* of the transfer robot 20. In addition, in the robot movement step S52, the virtual coordinate value (x3', y3') is recorded by moving the first distance d2 on the plane coordinate system 3*a* of the measurement unit 30.

Next, in the second phase value calculation step S53, the second phase value calculation unit 48 of the analysis part 40 calculates the second phase value θ2 by a contained angle of a line connecting the center coordinate value (x1,y1) of the transfer robot 20 on the plane coordinate system 3*a* of the measurement unit 30 and the movement coordinate value (x3, y3), and a line connecting the center coordinate value (x1, y1) of the transfer robot 20 and the virtual coordinate value (x3,y3).

Next, in the teaching coordinate calculation step S54, the teaching coordinate calculation unit 49 of the analysis part 40 generates a teaching coordinate value which teaches the center coordinate value (x1, y1) of the transfer robot 20 by applying the trigonometric function formula to the distance value d1, the first phase value θ1, and the second phase value θ1 on the plane coordinate system 3*a* of the measurement unit 30. In this case, the teaching coordinate value (x4, y4) may be calculated by the following formula (6) on the plane coordinate system 3*a* of the measurement unit 30, as described above.

$$x4 = d1 * \cos(\ominus 2 + \ominus 1),\ y4 = d1 * \sin(\ominus 2 + \ominus 1) \quad \text{formula (6)}$$

(Here, d1 is the distance value d1 to the center coordinate value (x1,y1) of the transfer robot 20 on the plane coordinate system 3*a* of the measurement unit 30, 01 is the first phase value, and θ2 is the second phase value.)

At this time, the teaching coordinate value (x4, y4) generated by the teaching coordinate calculation step S54 is input to the transfer robot 20 after setting a sign of the coordinate in reverse. Then, since the center coordinate value (x1, y1) of the transfer robot 20 matches the center coordinate value (0,0) of the support unit 10, the center of the substrate 1*a* can be matched with the center coordinate value (0,0) of the support unit 10.

In this way, the substrate teaching method according to an embodiment of the inventive concept can be taught so that the center of the substrate 1*a* matches the center of the support unit 10 even when the center of the measurement unit 30 and the center of the transfer robot 20 do not match.

The effects of the inventive concept are not limited to the above-mentioned effects, and the unmentioned effects can be clearly understood by those skilled in the art to which the inventive concept pertains from the specification and the accompanying drawings.

Although the preferred embodiment of the inventive concept has been illustrated and described until now, the inventive concept is not limited to the above-described specific embodiment, and it is noted that an ordinary person in the art, to which the inventive concept pertains, may be variously carry out the inventive concept without departing from the essence of the inventive concept claimed in the claims and the modifications should not be construed separately from the technical spirit or prospect of the inventive concept.

What is claimed is:

1. A substrate treating apparatus, comprising:

a support configured to support a substrate, the support having a support region;

a transfer robot configured to transfer the substrate to the support;

a measurement unit configured to measure the substrate and the support and detect information on a boundary location of the substrate and the support from an overhead perspective; and a processor of an analysis part configured to communication with the measurement unit to be input with information on the boundary location, to calculate a first center coordinate value of the substrate and a second center coordinate value of the support using input information on the boundary location, to set a calculated center coordinate value of the support as a third center coordinate value of the measurement unit, to set a calculated center coordinate value of the substrate as a fourth center coordinate value of the transfer robot, to record the fourth center coordinate value of the transfer robot on a plane coordinate system of the measurement unit, and to convert a recorded center coordinate value of the transfer robot and the third center coordinate value of the measurement unit to a plane coordinate system of the transfer robot to guide a movement of the transfer robot.

2. The substrate treating apparatus of claim 1, wherein the processor of the analysis part is configured to control a support side reference line detection unit configured to be input with digital image information in connection with an image conversion unit, and to analyze the support within the digital image information to detect a support side reference line; and a support center calculation unit configured to be input with the support side reference line in connection with the support side reference line detection unit, and to calculate a center of the support side reference line to calculate the second center coordinate value of the support.

3. The substrate treating apparatus of claim 2, wherein the processor of the analysis part is further configured to control a substrate side reference line detection unit configured to be input with the digital image information in connection with the image conversion unit, and to analyze the substrate within the digital image information to detect a substrate side reference line; and a substrate center calculation unit configured to be input with the substrate side reference line detection unit in connection with the substrate side reference line detection unit, and to calculate a center of the substrate and to calculate the first center coordinate value of the substrate.

4. The substrate treating apparatus of claim 3, wherein the processor of the analysis part is further configured to control a measurement unit and transfer robot center calculation unit configured to be input with the first center coordinate value of the support in connection with the support center calculation unit, to be input with the first center coordinate value of the substrate in connection with the substrate center calculation unit, to set the second center coordinate value of the support as the third center coordinate value of the measurement unit, and to set the first center coordinate value of the substrate as the fourth center coordinate value of the transfer robot.

5. The substrate treating apparatus of claim 4, wherein the processor of the analysis part is further configured to control a first phase value calculation unit configured to be input with the third center coordinate value of the measurement unit and the fourth center coordinate value of the transfer robot in connection with the measurement unit and transfer robot center calculation unit, and to calculate a first phase value with an angle value at which the fourth center coordinate value of the transfer robot is positioned with respect to the third center coordinate value of the measurement unit when the fourth center coordinate value of the transfer robot is changed to a plane coordinate system of the measurement unit.

6. The substrate treating apparatus of claim 5, wherein the processor of the analysis part is further configured to control a movement record unit configured to move the transfer robot by a first distance to record a movement coordinate value on a plane coordinate system of the transfer robot so any one coordinate value is not changed on the plane coordinate system of the transfer robot, and to move the fourth center coordinate value of the transfer robot by the first distance on the plane coordinate system of the measurement unit as well to record a virtual coordinate value; and a second phase value calculation unit configured to be input with the third center coordinate value of the measurement unit and the fourth center coordinate value of the transfer robot in connection with the measurement unit and the center calculation unit of the transfer robot, to be input with the movement coordinate value and the virtual coordinate value in connection with the movement record unit, and to calculate a second phase value with an angle value between a line connecting the movement coordinate value and the fourth center coordinate value of the transfer robot on a plane coordinate system of the measurement unit and a line connecting the fourth center coordinate value of the transfer robot and the virtual coordinate value.

7. The substrate treating apparatus of claim 6, wherein the processor of the analysis part is further to control a teaching coordinate calculation unit configured to generate a teaching coordinate value which teaches the fourth center coordinate value of the transfer robot by applying a trigonometric function formula to the first phase value, the second phase value, and the distance value on the plane coordinate system of the measurement unit.

8. The substrate treating apparatus of claim 7, wherein the teaching coordinate value is determined at the third center coordinate value of the measurement unit, as $$x4 = d1 * \cos(\ominus 2 + \ominus 1),\ y4 = d1 * \sin(\ominus 2 + \ominus 1) \quad \text{formula (6)}$$

wherein the teaching coordinate value is x4, y4, d1 is a distance value to the fourth center coordinate value of the transfer robot on the plane coordinate system of the measurement unit, θ1 is the first phase value, and θ2 is the second phase value.

9. The substrate treating apparatus of claim 1, wherein the support includes:

an electrostatic chuck providing a region on which the substrate is mounted and which sucks the substrate; and an outer protective body positioned outside the electrostatic chuck.

10. The substrate treating apparatus of claim 1, wherein the measurement unit includes:

a camera configured to image the support and the substrate to obtain image information on the support and the substrate; and an image conversion unit configured to be input with the image information in connection with the camera, and convert an input image information to a digital image information.

11. The substrate treating apparatus of claim 10, wherein the measurement unit further includes:

a laser irradiation unit configured to irradiate a laser in a line shaped to the support and the substrate, and the camera being configured to generate an image information including an image of the laser in a line shaped irradiated to a support and the substrate, and the analysis part being configured to detect a line change of a laser image included in the image information to distinguish a support side reference line and a substrate side reference line.

12. The substrate treating apparatus of claim 1, wherein at least four cameras are positioned to face the center of the support to obtain at least four image information, and an image information with respect to an intercept difference of the substrate and the support is obtained at each of the four image information.

13. A substrate treating apparatus comprising:

a support configured to include a region at which a substrate is mounted and which includes an electrostatic chuck for sucking the substrate and an outer protective body positioned outside the electrostatic chuck;

a transfer robot configured to transfer the substrate to the support;

a measurement unit configured to include a camera imaging the support and the substrate to generate an image information including a laser image in a line shaped irradiated to the support and the substrate, and wherein at least four cameras are positioned to face the center of the support to obtain at least four image information, and an image information with respect to an intercept difference of the substrate and the support is obtained at each of the four image information, an image conversion unit configured to be input with the image information in connection with the camera, and converting an input image information to a digital image information, and a laser irradiation unit configured to irradiate a laser in a line shaped to the support and the substrate; and a processor of an analysis part configured to control a support side reference line detection unit configured to be input with the digital image information in connection with an image conversion unit, and to analyze the support within the digital image information to detect a support side reference line;

a support center calculation unit configured to be input with the support side reference line in connection with the support side reference line detection unit, and to calculate a center of the support side reference line to calculate a first center coordinate value of the support;

a substrate side reference line detection unit configured to be input with the digital image information in connection with the image conversion unit, and to analyze the substrate within the digital image information to detect a substrate side reference line;

a substrate center calculation unit configured to be input with the substrate side reference line in connection with the substrate side reference line detection unit, and to calculate a center of the substrate to calculate a second center coordinate value of the substrate;

a measurement unit and transfer robot center calculation unit configured to be input with the first center coordinate value of the support in connection with the support center calculation and to be input with the first center coordinate value of the substrate in connection with the substrate center calculation unit, to set the first center coordinate value of the support as a third center coordinate value of the measurement unit, and to set the second center coordinate value of the substrate as a fourth center coordinate value of the transfer robot;

a first phase value calculation unit configured to be input with the third center coordinate value of the measurement unit and the fourth center coordinate value of the transfer robot in connection with the measurement unit and transfer robot center calculation unit, and to calculate a first phase value with an angle value at which the fourth center coordinate value of the transfer robot is positioned with respect to the third center coordinate value of the measurement unit when the fourth center coordinate value of the transfer robot is changed to a plane coordinate system of the measurement unit;

a movement record unit configured to move the transfer robot by a first distance so a coordinate value of any one axis is not changed on a plane coordinate system of the transfer robot to record a movement coordinate value on the plane coordinate system of the transfer robot, and to move the fourth center coordinate value of the transfer robot by the first distance on the plane coordinate system of the measurement unit as well to record a virtual coordinate value;

a second phase value calculation unit configured to be input with the third center coordinate value of the measurement unit and the fourth center coordinate value of the transfer robot in connection with the measurement unit and the center calculation unit of the transfer robot, to be input with the movement coordinate value and the virtual coordinate value in connection with the movement record unit, and to calculate a second phase value with an angle value between a line connecting the fourth center coordinate value of the transfer robot and the movement coordinate value on the plane coordinate system of the measurement unit and a line connecting the fourth center coordinate value of the transfer robot and the virtual coordinate value; and a teaching coordinate calculation unit configured to generate a teaching coordinate value for teaching the fourth center coordinate value of the transfer robot by applying a trigonometric function formula to the first phase value, and the second phase value, and a distance value on the plane coordinate system of the measurement unit, and wherein the teaching coordinate value is determined at the third center coordinate value of the measurement unit, as $$x4 = d1 * \cos(\theta 2 + \theta 1),\ y4 = d1 * \sin(\theta 2 + \theta 1) \quad \text{formula (6)}$$

wherein the teaching coordinate value is x4, y4, d1 is a distance value to the fourth center coordinate value of the transfer robot on the plane coordinate system of the measurement unit, θ1 is the first phase value, and θ2 is the second phase value.

* * * * *